(12) United States Patent
Mohler

(10) Patent No.: US 9,805,311 B1
(45) Date of Patent: Oct. 31, 2017

(54) EVENT FORECASTING SYSTEM

(71) Applicant: George O. Mohler, San Jose, CA (US)

(72) Inventor: George O. Mohler, San Jose, CA (US)

(73) Assignee: Predpol, Inc., Santa Cruz, CA (US)

(*) Notice: Subject to any disclaimer, the term of this patent is extended or adjusted under 35 U.S.C. 154(b) by 248 days.

(21) Appl. No.: 14/612,039

(22) Filed: Feb. 2, 2015

Related U.S. Application Data

(63) Continuation of application No. 13/605,737, filed on Sep. 6, 2012, now Pat. No. 8,949,164.

(60) Provisional application No. 61/573,541, filed on Sep. 8, 2011.

(51) Int. Cl.
*G06N 7/00* (2006.01)
*H04L 29/08* (2006.01)
*G06N 5/02* (2006.01)

(52) U.S. Cl.
CPC ............... *G06N 7/005* (2013.01); *G06N 5/02* (2013.01); *H04L 67/10* (2013.01)

(58) Field of Classification Search
CPC ...................................... G06N 7/005
USPC ........................................... 706/46
See application file for complete search history.

(56) References Cited

U.S. PATENT DOCUMENTS 8,924,332 B2   12/2014   Maciejewski et al.

OTHER PUBLICATIONS

Smith et al ("CrimeStat III User Workbook" 2008).*

* cited by examiner

*Primary Examiner* — Lut Wong
(74) *Attorney, Agent, or Firm* — Advantage IP Law Firm

(57) ABSTRACT

Generally provided herein is a predictive policing system including at least one crime prediction server constructed to process historical crime data to produce a crime forecast assigning at least one geographic region to at least one crime type for use in crime prevention, deterrence, and disruption practices.

28 Claims, 11 Drawing Sheets

(1)

(2)
(3)
(4)
(5)
(6)

} 76

} 242

$$\lambda_m(t) = \mu_m + \sum_{\{t_k < t\}} g(t-t_k) 1\{t_k \in c_m\},$$

240

Expectation step:

$$p_{ij} = \frac{K_0 \omega e^{-\omega(t_i-t_j)} 1\{t_i, t_j \in c_m\}}{\mu_m + \sum_{\ell=1}^{i-1} \theta \omega e^{-\omega(t_i-t_\ell)} 1\{t_i, t_\ell \in c_m\}}$$

$$p_{ii} = \frac{\mu m}{\mu_m + \sum_{\ell=1}^{i-1} \theta \omega e^{-\omega(t_i-t_\ell)} 1\{t_i, t_\ell \in c_m\}}$$

Maximization step:

$$\mu = \frac{\sum_{i=1}^{N} p_{ii}}{T}$$

$$\theta = \frac{\sum_{i>j} p_{ij}}{N}$$

$$\omega = \frac{\sum_{i>j} p_{ij}}{\sum_{i>j} (t_i - t_j) p_{ij}}$$

FIG. 9

EVENT FORECASTING SYSTEM

CROSS-REFERENCE TO OTHER APPLICATIONS

This application is a continuation of U.S. patent application Ser. No. 13/605,737, now U.S. Pat. No. 8,949,164, filed on Sep. 6, 2012 and entitled Event Forecasting System, which in turn claims the benefit of U.S. Provisional Patent Application No. 61/573,541, filed on Sep. 8, 2011, and entitled Epidemic Type Aftershock Sequence (ETAS) Point Process Crime Forecasting, which are both hereby incorporated by reference in their entireties, including Appendices A and B.

GOVERNMENT LICENSE RIGHTS

Portions of this invention may have been made with Government support under contracts DMS-0968309 and BCS-0527388 awarded by National Science Foundation (NSF) and under contracts ARO MURI 50363-MA-MUR, 58344-MA and AFOSR FA9550-10-1-0569 awarded by the Multidisciplinary University Research Initiative (MURI). The Government may have certain rights in this invention.

BACKGROUND

1. Field of the Invention

The present invention relates to event forecasting systems, and more particularly to, crime forecasting systems for enhancing crime prevention methods.

2. Background

Police departments nationwide are facing budget freezes and deep cuts, requiring them to manage their resources more effectively while still responding to public demand for crime prevention and reduction. Because of this, there has been a more recent emphasis on attempting to predict crime before it occurs so as to focus precious resources in higher crime risk areas to maximize the potential of the public safety force.

Examples of more basic crime prediction or forecasting techniques include: crime counts, pin maps depicting past crime locations, and crime hotspot maps (density estimation) as some of the proposed methods of managing and allocating police resources. However, these methods have generally proven unsatisfactory because they fail to take into account both long-term spatial variation in risk as well as short term elevation in risk following crime in a systematic way.

Thus, while crime hotspot maps attempt to quantify the contagious spread of crime following past events, they fail to assess the likelihood of future "background" events, the initial events that trigger crime clusters. Moreover, crime hotspot maps typically rely on the assumption that short term crime trends will persist into the future, while ignoring the presence of background events.

In analyzing historical crime data, it is increasingly accepted that crime spreads through local environments via a contagion-like process. An initial crime (background event) can lead to a sequence of nearby, related crimes (aftershocks), similar to the spread of an epidemic or the occurrence of aftershock sequences following earthquakes. Thus, near-repeat patterns have been established to exist in certain types of crime data, for example, property crime and gang violence, where the occurrence of an event increases the likelihood of more events in the future. For example, burglars repeatedly attack clusters of nearby targets because local vulnerabilities are well-known to the offenders. Likewise, a gang shooting may incite waves of retaliatory violence in the local set space (territory) of the rival gang. The local, contagious spread of crime leads to the formation of crime clusters in space and time. Recognizing this, hotspot policing strategies use past crime clusters to estimate where crime is likely to occur in the future. In dealing with crime data, crime hotspot maps are the most widely used tool for the quantification of future crime risk and are a key element in hotspot policing.

While hotspot policing is well known, where officers are deployed to areas that have had a high crime count over a given time interval, it is much less standard to use sophisticated computer models to assign probabilities to space time regions for the purpose of allocating police patrols. One such effort at a more advanced level of crime data analysis may be found in a software application named Crimestat. However, this software does not predict near-repeat patterns and is relatively cumbersome to use and learning curve intensive since it requires expertise in GIS and additional software such as Arc GIS.

While it has long been known that crime is unevenly distributed in space forming so-called hotspots, with the advent of widespread digital mapping in the 1990s, it quickly became apparent that crime patterns are also highly dynamic with hotspots emerging and spreading through space and dissipating as rapidly as they form. Law enforcement agencies recognized that targeting crime hotspots might represent a more effective use of their resources. However, the rapidity with which crime hotspots evolve makes efficient targeting of them difficult.

One approach, widely practiced in contemporary law enforcement today, is to target only most persistent crime hotspots. This approach comes with the drawback that it is largely static and ignores the great volume of crime occurring in shorter lived and more dynamic hotspots. The alternative is to 'chase' all crime as it appears. The drawback here is that law enforcement may end up chasing many single-event crimes that are not part of an emerging crime pattern. Given the drawbacks of the foregoing methods, demand for more sophisticated approaches followed.

Kernel density hotspot mapping is another currently used technique to allocate police resources (Chainey and Ratcliffe, 2005). The drawback of this method is that crime patterns in the past are assumed to persist into the future and thus patrols based upon such a model focus on observed hotspots from the past.

Prospective hotspot mapping (Bowers et al, 2004) attempts to address the drawback of the Chainey and Ratcliffe method by weighting crimes in the past with a temporally decaying kernel. This method has its own drawbacks. The estimate of risk it provides is only based upon the past several weeks of data, thus ignoring valuable information contained on the spatial distribution of risk (and thus the method is susceptible to high variance in risk estimates). Furthermore, the manner by which the parameters are selected are not through any optimization procedure and thus for a given city the kernel used is likely inaccurate.

Thus, while prospective hotspotting or prospective hotspot mapping is an existing method that has been developed to forecast near-repeat patterns for the purpose of directed patrols, this method fails to distinguish between spontaneous events (the analogy in seismology would be mainshocks or the main event) and triggered events (aftershocks). Moreover, the method does not allow for parameter estimation using a rigorous methodology such as Maximum Likelihood Estimation (MLE) and is less suitable for automation or use on a large scale.

Since the risk associated with background events comprises a substantial proportion of the total future crime risk and the failure to account for these events has important implications for crime prediction, what is needed and previously unavailable is an improved predictive policing system that provides targeted, real-time, crime prediction forecasts that may take into account both spontaneous and triggered events and that are presented in a user friendly format for patrol officers and shift commanders to better manage limited patrol resources.

SUMMARY

In accordance with the principles of the present invention, one preferred embodiment of a predictive policing system is provided with at least one crime prediction server constructed to process historical crime data corresponding to at least one crime to produce a forecast assigning a geographic region to at least one crime type and combine the forecast with a visual map element to create a predictive crime report having at least one geographic region and a probability of a future crime occurrence associated with at least one crime type.

In another aspect of the present invention, the prediction server is constructed to communicate within a large scale telecommunication system and transmit predictive crime reports to remote locations.

Another aspect of the present invention may be found in the application of bounded high risk regions on a visual display map with crime probability indicators.

Yet another feature of the present invention is the incorporation of a GPS feedback feature to determine if an officer is within a high risk region.

One or more methods for using the predictive policing system are also disclosed herein.

All of the embodiments summarized above are intended to be within the scope of the invention herein disclosed. However, despite the discussion of certain embodiments herein, only the appended claims (and not the present summary) are intended to define the invention. The summarized embodiments, and other embodiments and aspects of the present invention, will become readily apparent to those skilled in the art from the following detailed description of the preferred embodiments having reference to the attached figures, the invention not being limited to any particular embodiment(s) disclosed.

BRIEF DESCRIPTION OF THE DRAWINGS

FIG. 9 is an exemplary forecasting algorithm that may be used in developing the crime forecasts output by the predictive policing system of FIGS. 1-4.

DETAILED DESCRIPTION OF THE PREFERRED EMBODIMENTS

Figure 1:
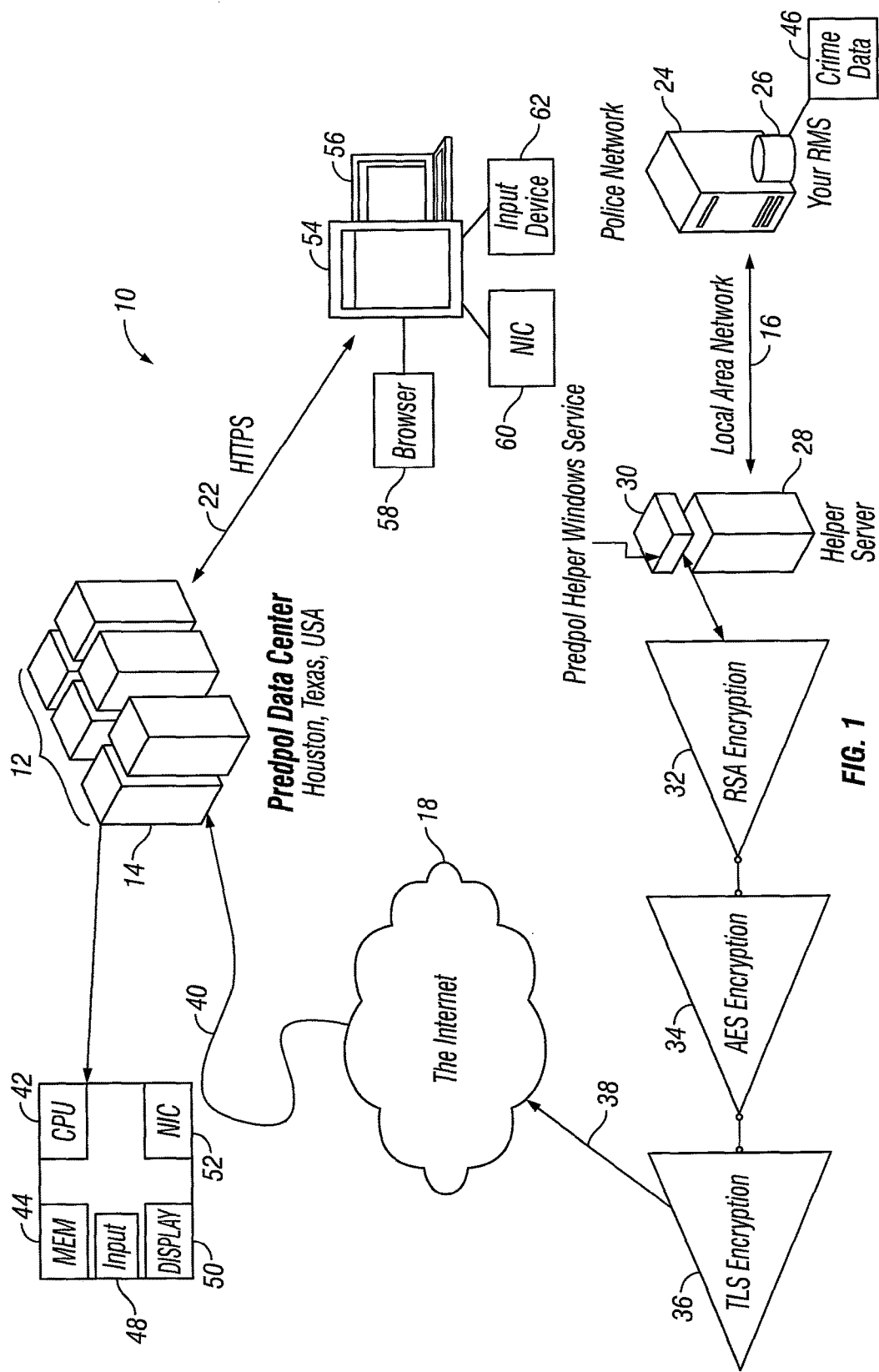
FIG. 1 is a schematic diagram of an exemplary predictive policing system in accordance with the principles of the present invention.

With reference to FIGS. 1-5B, a predictive policing or crime forecasting system (also referred to as the "predpol" system), generally designated 10, is described herein. In general terms, predictive policing may be explained as a tool or technology that increases the odds of disrupting, deterring, or stopping one or more crimes in a particular area of interest. The tool may also output a crime forecast scalable for any size jurisdiction. The tool is preferably offered as a Software as a Service (SaaS) type of product (or network portal) available over the internet or other large network portal using secure access protocols to make the information available immediately when and where it is needed, particularly prior to a patrol shift for tactical planning purposes and out in the field for real-time tactical adjustments. A user friendly interface is emphasized to encourage its use and bring newer police officers or patrol officers up to speed more quickly. It will also be appreciated that the predictive policing tool 10 is further designed to enhance and supplement patrol veterans' intuition and experience by providing an additional level of detail concerning crime risks and probabilities for a particular geographic region in which they likely patrol or may patrol.

In general, the predpol system 10 assigns probabilities to locations where crime is most likely to occur and designates the highest probability locations with distinctive red box. When a patrol officer is "in the box" they have entered a high-probability crime area. The predpol system 10 helps to solve the problem of assigning probabilities to regions of space time for the occurrence of criminal activity and allocating police resources efficiently in the highest risk areas of a city over a specified time interval.

In general terms, the predpol system is a mathematically-based data analytic Software as a Service (SaaS) system or web based application, continuously accessible from a cloud-based platform, for delivering real-time predictions of the future locations and times of crimes (criminal events) in small prediction boxes (in this exemplary embodiment, 500'×500', or 150×150 m) that may be used as a primary or alternative basis for directing law enforcement agencies to pre-position resources to disrupt crime and deny criminal opportunities. The server takes crime data as input and generates space-time forecasts using an ETAS point process model of crime. The forecasts are visualized using a mapping application such as Google maps and give the areas and time windows where police should direct patrols each day.

The predpol data analytic system 10 includes at data center 12 with at least one predictive server 14 with the predictive server generally performing four steps: (1) conducting real-time analysis of evolving crime data via live connections with crime data bases; (2) using mathematical analysis to assign quantitative probabilities (the predictions) to where, when and what type of crime will occur; (3) projecting crime predictions into small (500×500' or 150×150 m), non-overlapping spatial target areas (boxes); and (4) making tactical recommendations for police resource allocations based on mathematical analyses.

As for components in general, the predictive policing system 10 is made of hardware and software components all cooperating together to process crime data from historical crime reports through a forecasting algorithm (the ETAS algorithm) to output a predictive pattern of crime on a visual display. Such predpol system 10 is generally available through a registered account and login screen at www.predpol.com or https://mh.predpol.com over the internet and will be described in more detail below.

Referring now to FIG. 1, the predictive policing system 10 is managed through a data center or secure location 12 having at least one predictive server 14. The predictive server may be placed in communication with a police network 16 over the internet 18 and also to one or more user servers 20 over a secure connection 22 via the internet or other suitable line of communication. The police network 16 may include one or more clients 24 and includes a record management system (or database) 26 containing historical crime data 46. The police clients may be relatively simple computers or terminals with the capability of transmitting the crime data over the internet 18 to the data center 12.

The local area police network 16 may be placed in communication with a helper server 28 loaded with a Predpol Helper Windows Service 30 that may be used to encrypt the crime data 46 transmitted from the police station clients 24. The Predpol Helper Windows Service 30 passes the crime data through a first RSA filter (module, tier, layer, device, algorithm, or function) 32, an AES filter 34, and a TLS encryption module 36 before passing over a communication line 38 to the internet 18 where the secure crime data 46 may then be forwarded on or received by the data center predictive server 14 over another communication line 40.

The helper windows service 30 initially processes the crime data received from the police client 24 through the RSA Encryption module 32. RSA is an algorithm for public-key cryptography. After passing through the RSA encryption module 32, the data is next transferred to an Advanced Encryption Standard process 34. The Advanced Encryption Standard (AES) is a well-known algorithm in the form of a block cipher ratified as a standard by National Institute of Standards and Technology of the United States (NIST) and was chosen using a process markedly more open and transparent than its predecessor, the aging Data Encryption Standard (DES).

Once the data is filtered through the AES Encryption module 34, the crime data is then processed through the Transport Layer Security (TLS) module 36, an advanced form of Secure Sockets Layer (SSL) encryption device that provides a first security communication protocol for securing communication over applications such as web browsing, electronic mail, Internet faxing, instant messaging and voice over-IP (VoIP) over the network 18 via secure line 38. The TLS protocol allows client-server applications to communicate across a network in a way designed to prevent eavesdropping and tampering. All three encryption modules 32, 34, and 36 (devices, algorithms) are well known in the art and may be used to secure both one-way or two-way communication between the client computers 24 and the data center 12 and the data center's predictive policing server 14.

With continued reference to FIG. 1, an exemplary predictive server or processing device 12 includes a processing unit 42, a memory unit 44, an input device 48, a monitor or display screen 50, and a network interface connection 52. A suitable processing device has been found to be a server available from Rackspace, a company renting server space or virtual server space that enables a client to run data in isolated sections, slices, or areas of the server. In this exemplary embodiment, each server includes 30 GB RAM. The server may further be divided into dedicated slices of about ¹/₆₄ capacity per police station associated with 20 GB of disk space for storage. Although not required, it is preferred to isolate the slices to add another layer of security to the process so that each police station or agency is maintained separately.

As for storage of the crime data and related output as processed by the processing device to generate the reports, an exemplary database associated with the processing device 14 (server) or server slice that has been found to be suitable is a MySQL relational database. Other suitable databases structures will occur to one of ordinary skill in the art as well. Generally, for each type of crime, a geographic region (map of a city for example) may be divided up into 150 m×150 m grids or cells. Then, the probability of a crime of that type occurring each hour of the day is stored in the database for every cell as well as the probability of a crime of that type occurring that day. This crime data information may be stored in the database in one or more matrices. At run time, when a report is requested as described below, then the respective matrices may be loaded and a scoring algorithm applied to rank each cell according to the probabilities.

Given the minimal computing power and storage requirements since, in general, the crime data is typically in a text format allowing for a quick data load, and that the predictive process is streamlined and the user interface simplified, it will further be appreciated that generally any modern microprocessing device, both fixed and mobile, will be suitable for a predpol tool 10 installation such as on a variety of processing devices including tablets, smartphones, servers, desktop computers, laptop computers, and other suitable processing devices. Of course, as the amount of data increases or decreases, the processing device and related specifications may be scaled up or down as necessary.

At the other end of the predpol system 10 communication network is a user device 54 that includes a display screen 56 and is loaded with a web browser 58 and includes a network interface 60 and input device 62. It will be appreciated that the user device may be a desktop or laptop computer, smartphone, PDA, tablet, or other mobile device that includes a browser, network interface device, and input device for browsing over the internet to request data from the prediction server 12. Wired network interfaces, wireless network interfaces, or a combination thereof are contemplated. In general, the user device may be used for requesting the predictive crime reports from the data center 12 and may be located at a patrol station in a fixed location or a portable unit that travels with one or more patrol officers out in the field, either in a police vehicle or carried by the patrol officer.

Overall, the flow of crime data 46 runs from the police client 24 through the helper server 28 where it is processed through a series of encryption filters 32, 34, and 36 by a helper windows service 30 before being transferred via the internet 18 to the data center 12 for further processing as will be explained below.

Figure 2:
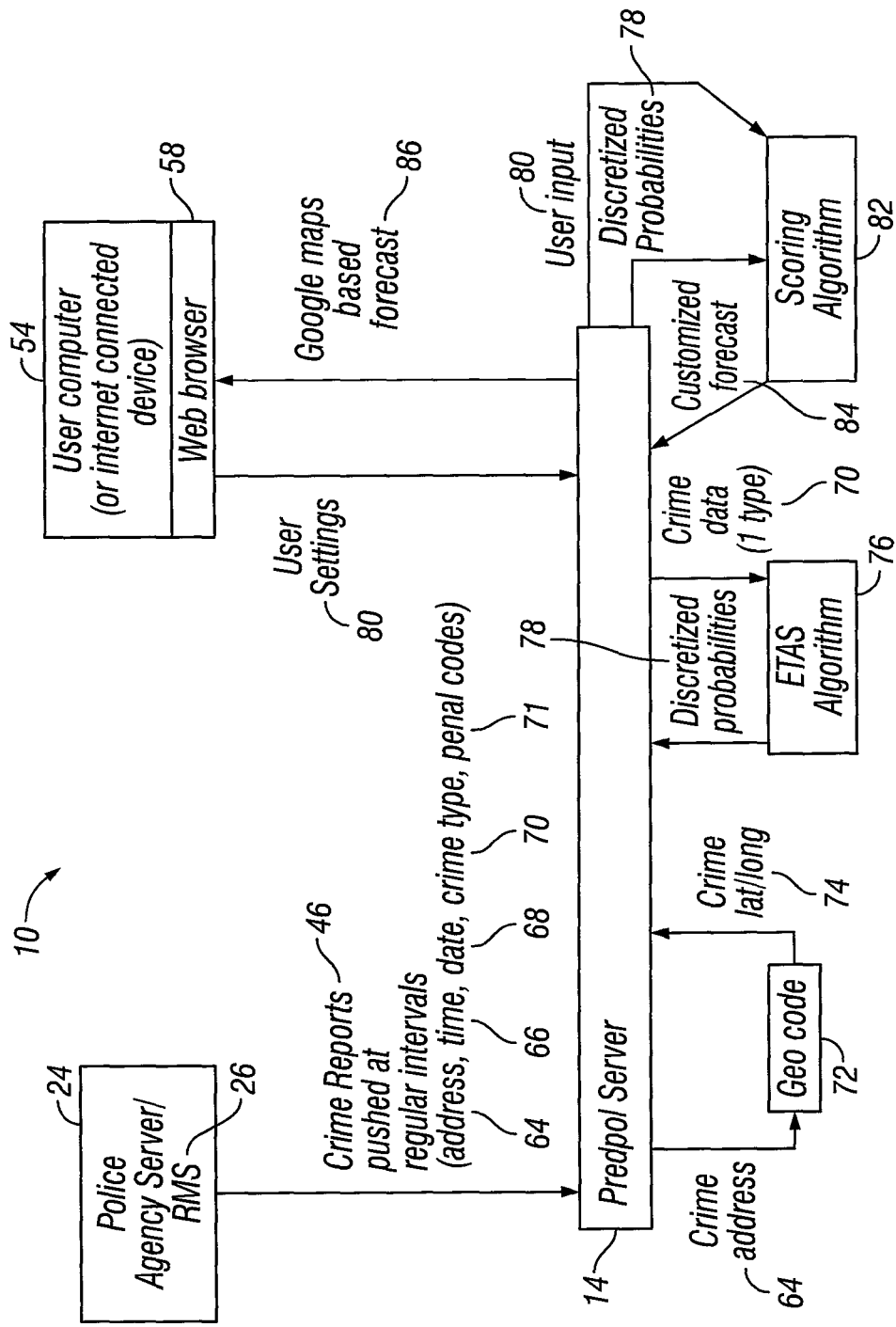
FIG. 2 is a block diagram of a first embodiment of a set of exemplary hardware and software components that may be used with the predictive policing system of FIG. 1 in accordance with the principles of the present invention.

Turning now to FIG. 2, the general components and data flow of the predpol system 10. In one part of the predpol system 10, the police or agency client 24 pushes one or more crime reports 46 at regular intervals to the predpol server 14 in the data center 12. Crime reports generally include crime locations or addresses 64, crime times 66, dates 68, and crime types 70. Exemplary crime types include such crimes as theft, auto crime, burglary, robbery, assault, and other felonies and misdemeanors. These are not meant to be limiting in any manner and any felony or misdemeanor may be submitted by the agency client 24 for predictive processing.

The crime location or street address 64 may further be processed by the predictive server 14 using a geocode routine 72 resulting in a latitude/longitude set 74 corresponding to the crime address if desired.

With continued reference to FIG. 2, the crime data 64, 66, 68, 74 (collectively 46 with the crime type 70) relating to a particular crime type 70, is sent to the ETAS algorithm 76, discussed in more detail below, processes the crime data and outputs one or more discretized probabilities 78. A penal code 71 may also be associated with each crime type. The ETAS algorithm is used to assign the probability of at least one crime occurring in a 150 m×150 m (approx. 500 feet by 500 feet) region of space and time interval. Thus for a given discretization of space-time, there is a discrete probability distribution over that discretization.

In addition to the crime reports 46 fed to the predictive server 14, the user computer 54 or other internet connected device in communication with the predpol server 14 using a web browser interface 58 feeds user settings or input 80 with the input device 62 (FIG. 1) to the predpol server 14. Settings include such preferences as report type, crime type, watch, police predictions, and crime history.

Figure 5A:
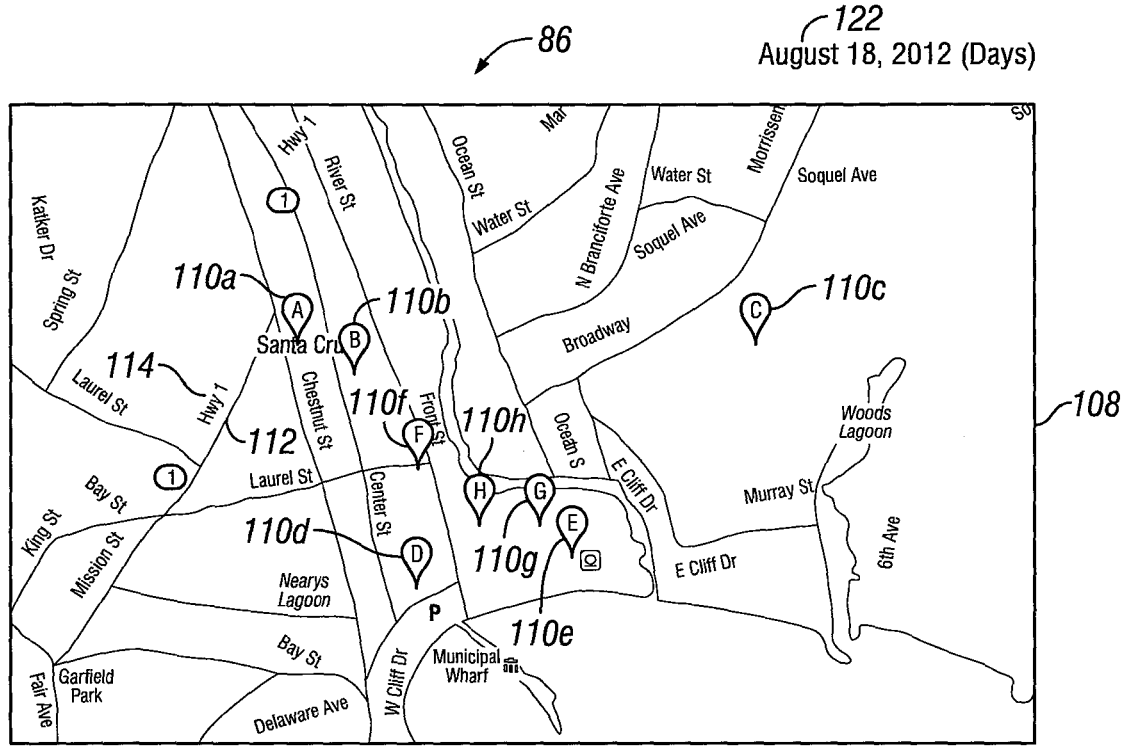
FIG. 5A is a schematic of an exemplary report that may be output by the predictive policing system of FIGS. 1-4.

The user input or settings 80 and discretized probabilities 78 are fed to a scoring algorithm 82 which may produce at least one forecast or prediction 84 customized according to the user settings. The predictive server 14 then overlays the forecast 84 on a map associated with the user selected geographic area using an application such as Google maps to produce a Google maps based forecast 86 for display on a monitor 56 in communication with the user's computer 54 in a browser window. An exemplary mapped forecast 86 is shown in FIG. 5A.

Figure 3:
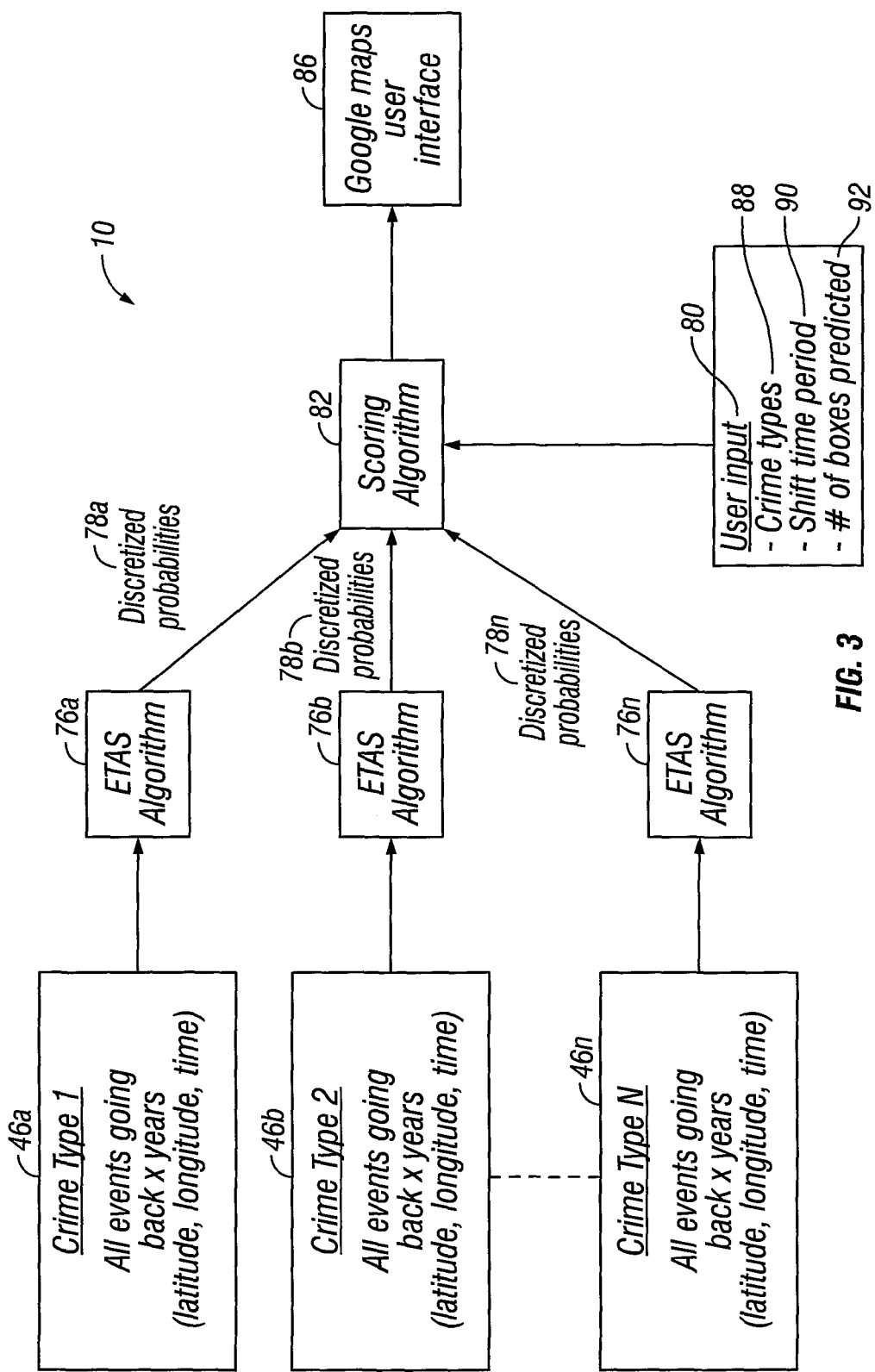
FIG. 3 is a block diagram of a set of exemplary software components with process flow for use with the predictive policing systems of FIGS. 1-2.

Referring now to FIG. 3, an exemplary software process or routine for executing the predictive forecasting report 86 will now be discussed. In this example, N number of historical crime data sets 46a, 46b, . . . 46n are the starting point of the process. Each crime data set includes all events relating to a particular crime type going back X number of years and include the address and associated latitude and longitude where the crime occurred, time the crime occurred, and date the crime occurred. The crime data sets are similar to the crime reports 46 (FIG. 2) discussed above may be processed by the geocode routine 72 resident in the predictive server 14.

Each crime data set 46a-n is fed into the ETAS algorithm 76a, 76b, . . . 76n, which output discretized probability sets 78a, 78b, . . . 78n. The discretized probabilities are then passed to the scoring algorithm 82 which takes into account user input 80, including user selected crime types 88 selected by the user, shift or watch time period 90 selected by the user, and number of boxes predicted 92 as also selected by the user. The result of processing all this data by the processor 42 in the predictive server 14 is a forecast map 86 (FIGS. 3-5A)

Figure 4:
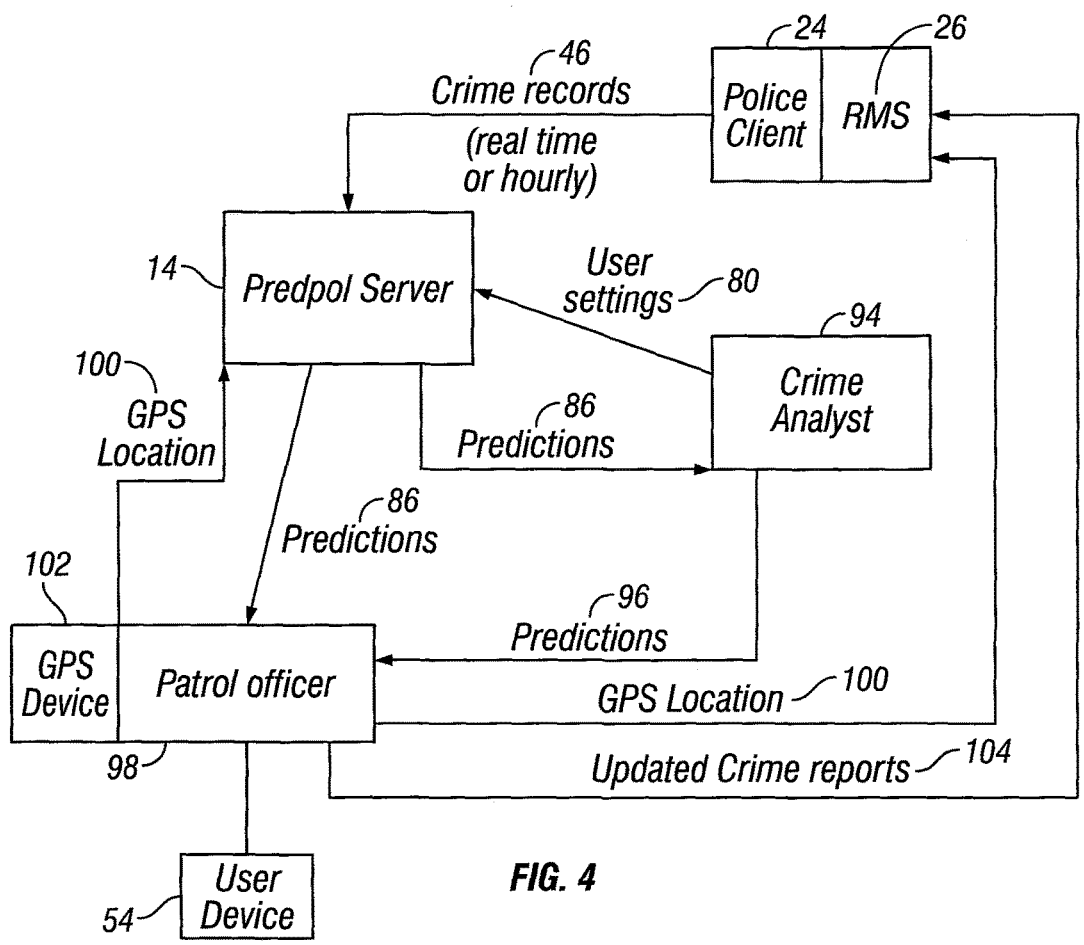
FIG. 4 is an exemplary block diagram illustrating the interaction between the users and the predictive policing system of FIGS. 1-3.

Referring now FIG. 4 shows the process for assisting the patrol office to get within the predictive box (FIG. 5C) by providing GPS aided assistance. In this exemplary process, the police client 24 and records management system (RMS) 26 transmit crime records 46 on a real time or periodic basis (such as hourly) to the predpol server 14. The predpol server receives user settings 80 from a crime analyst 94 using an input device 62 to the predpol server over a secure communication channel 22 (FIG. 1). The predpol server 14 may then generate predictions (forecast maps or predictive hotspot maps) 96 and transmit them to the crime analyst 94 and the user device 54 controlled by one or more patrol officers 98. If requested or required by protocol, the crime analyst may also offer an alternative set of crime prediction data 96 to the police officer 98 as a supplement to the crime forecasts 86. The patrol officer may also transmit his or her GPS location 100 using a GPS unit 102 in communication with a GPS satellite system back to the predpol server 14. The GPS location may also be transmitted back to the Police server 24 from the patrol officer along with actual updated crime reports 104 that may be processed for more real time results.

Figure 5B:
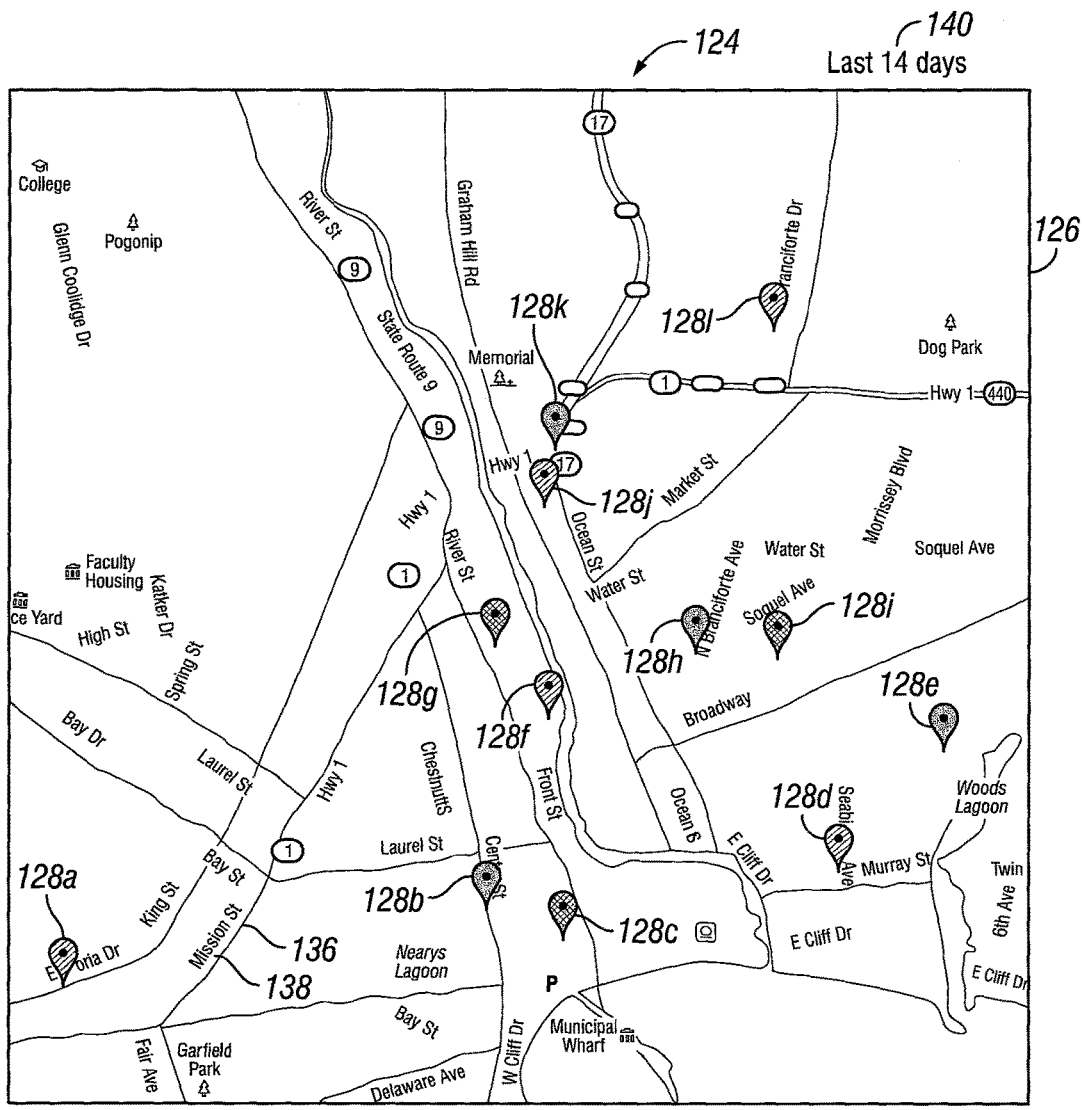
FIG. 5B is a schematic of another exemplary report that may be output by the predictive policing system of FIGS. 1-4.
Figure 5C:
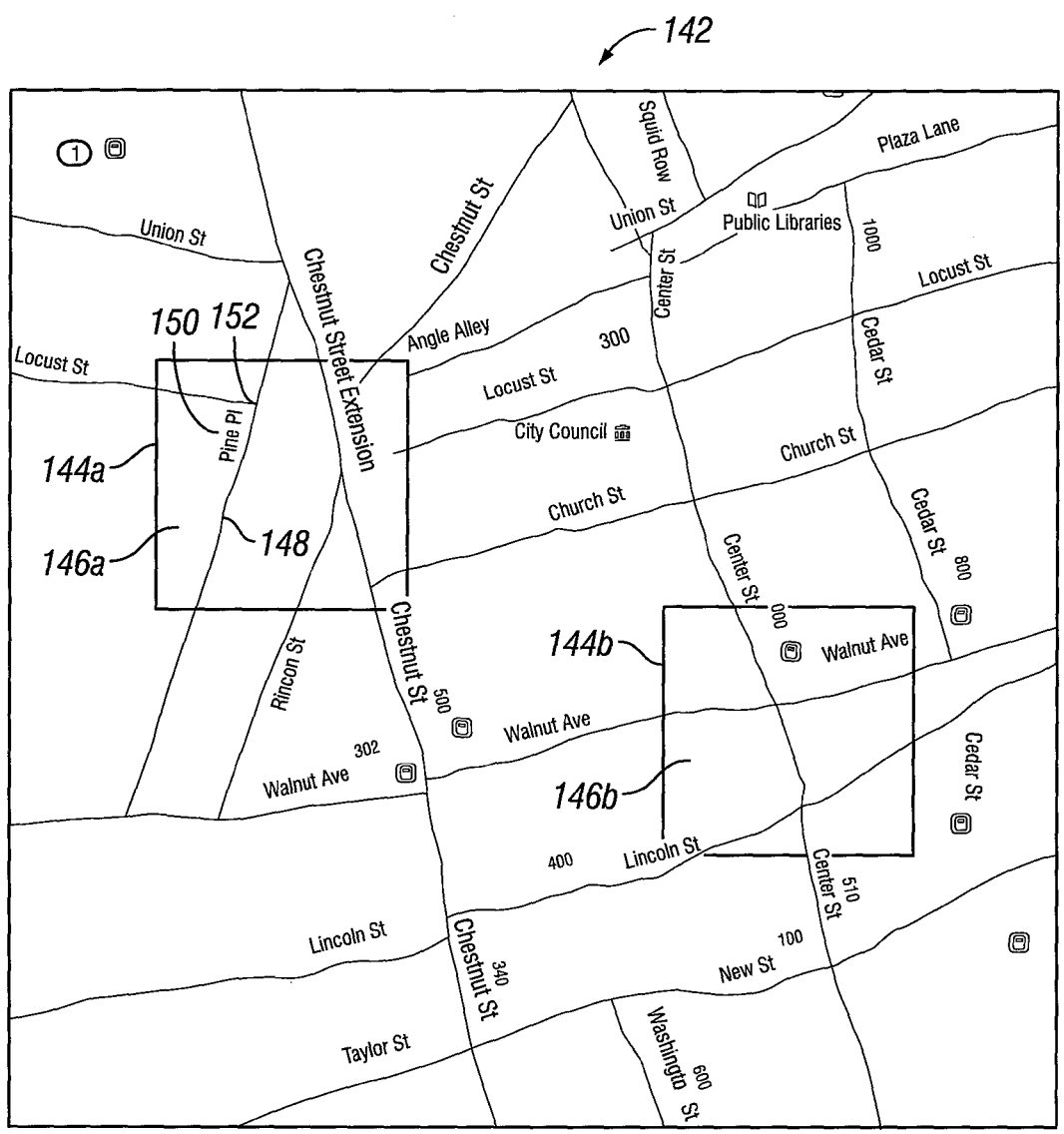
FIG. 5C is a schematic of yet another exemplary report that may be output by the predictive policing system of FIGS. 1-4.

Referring now FIGS. 5A-C, the output (reports, forecasts, predictions) of the predpol system 10 may include a report 86 such as that shown in FIG. 5A. As shown in this exemplary report, the first type of report is the overview predicted crime report. This report shows a street map view (or satellite or bird's eye) 108 that, depending on the crime data input to the predpol server 14, displays one or pushpins or balloons 110a-h indicative of likely crime hotspots. Street lines 112 and street names 114 help the report reviewer quickly identify the pushpin locations and areas of interest.

Still referring to FIG. 5A, a legend 116 is displayed beneath the map section 108. The legend includes listings 118a-h that correspond to each balloon 110a-h and provide additional identifying data such as cross streets, 120 for example. A date stamp 122 may also be displayed to show the currency of the report. The predictive server 14 may be programmed to only display certain balloons that pass a user selected or predetermined probability threshold after ranking each balloon data. This may reduce clutter on the map and also assist the patrol force in attending to the highest risk areas.

Turning now to FIG. 5B, a crime history report 124 may also be selected by the user 94, 96. This type of report provides a map view 126 with a set of one or more colored balloons or pushpins 128a-1 indicative of different crime types. The use of color aids the reviewer in quickly identifying particular crime types. In this exemplary embodiment, red balloons 128c, 128g, 128i, are used for vehicle burglary, blue balloons 128a, 128d, 128f, 128j, 128l used for burglary, and orange balloons 128b, 128e, 128h, 128k used to indicate auto theft locations. A legend 130 displayed beneath the map section 126 explains the balloon colors and designations by providing a color 132 and an associated crime type 134. Like the prior report 86, street lines 134 and street names 136 aid the reviewer in determining the geographic location of each balloon. An age indicator 138 also displays the age of the report.

In addition to the prior reports 86 and 124, the hotspot close-up report 142 (or in the box report) as shown for example in FIG. 5C. This report includes a closer view of the prior report 86. In this exemplary embodiment, a first hotspot box 144a corresponding to balloon A 110a in the predpol report 86 (FIG. 5A) and a second hotspot box 144*b* corresponding to balloon B 110*b* in the predpol report 86. Each box 144*a*, 144*b* defines an area 146*a*, 146*b*, respectively, represented in this example as a square. In this example, the box represents a 2500 square foot (500 feet by 500 feet or approx. 150 m×150 m) hotspot where crime of any type or a selected type are more likely to occur. Within each box, using 144*a* as an example, there are street lines 148, street names 150, and intersections 152. Additional birds-eye and street level detail for each predictive hotspot 144*a*, 144*b* may be obtained using typical zooming and panning tools such as those available using Google maps.

Figure 6:
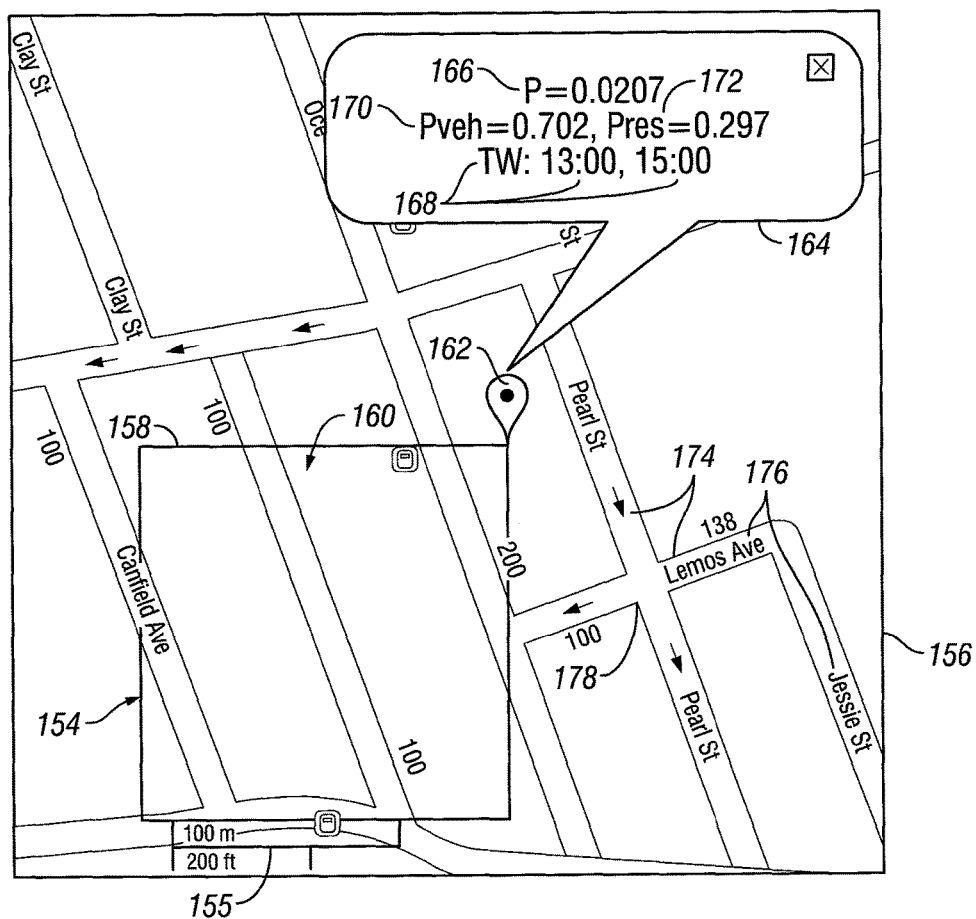
FIG. 6 is an exemplary user interface depicting a prediction or hotspot box and associated probabilities.

Turning now to FIG. 6, a closer view of an exemplary hotspot or predictive box 154 on a close up map section 156 taken from a report 142 such as that shown in FIG. 5C is depicted. In this example, the predictive box 154 includes an outline 158 in the form of a square defining an area 160 in which there is a high risk of a crime occurring in the future based on processing efforts of the predictive server 14 (FIG. 1). A pushpin 162 that may expand into a detail balloon 164 when scrolled over provides additional probability detail about the predictive box 154. In this example, the additional probability detail includes a Probability 166 that at least one crime of a particular type will occur the within one day of the report being issued (P=0.0207 or approx. a 2% chance in this example). The TW indicator 168 provides the start time of the two highest one hour risk windows for a crime to occur based on a twenty-four clock (in this example 1 pm and 3 pm). The probabilities may be broken down even further into crime type or crime category. For example, Pveh probability indicator 170 indicates a probability of a vehicular related crime will occur while Pres probability indicator 172 indicates a probability of a residence related crime will occur within a pre-defined time period (24 hours or 1 day for example). The info window 164 generally provides probability of one or more crimes, conditional probability of crimes by type, and the start times of the highest risk time windows. The time windows may be determined by assuming separability of the time of day process and using a histogram estimator with 1 hour bins. Crime types may be modeled separately or jointly depending on whether near-repeat patterns are believed to travel across crime type.

Still referring to FIG. 6, the map close up 156 includes street lines 174, street names 176, and intersections 178, both inside and outside the prediction box 154 to aid the patrol officer in navigating in and out of the prediction box 154. In addition, a scale 155 in both feet and meters is presented beneath the prediction box to provide additional detail regarding the area of interest within the prediction box.

It will be appreciated that the hotspots or boxes 144*a*, 144*b* in FIG. 5C and 154 in FIG. 6 are preferably just the right size to capture the locations that are at greatest risk of crime, but not so large so that box locations that are not really at risk are mixed into the display or user interface. Sometimes the prediction box involves just one or two houses that are at risk, or even a few parking spaces. Other times, the prediction box may be a whole block or city section and the box size may be adjusted accordingly.

Predictions are quantitative in that they are derived from the probability of one or more crimes occurring in a given region of space-time. In particular, this probability is estimated as the integral (approximated numerically) of the model conditional intensity over a prediction box and time interval. Quantitative predictions allows for clear calculation of uncertainty and measurement of accuracy with respect to predictions. One measurement of accuracy is the percentage of crime correctly predicted (in retrospective or prospective forecasts) normalized by the percentage of the total area flagged as high risk.

Hotspot prediction boxes may be tailored to each patrol shift and may be distributed to patrol officers via an automatically generated report or mobile device 54 (FIGS. 1 and 4). Officers may be typically recommended to perform fifteen minute patrols per every two hours in each hotspot box 144*a*, 144*b*, 154 to maximize the potential of using the predpol system 10.

Figure 7:
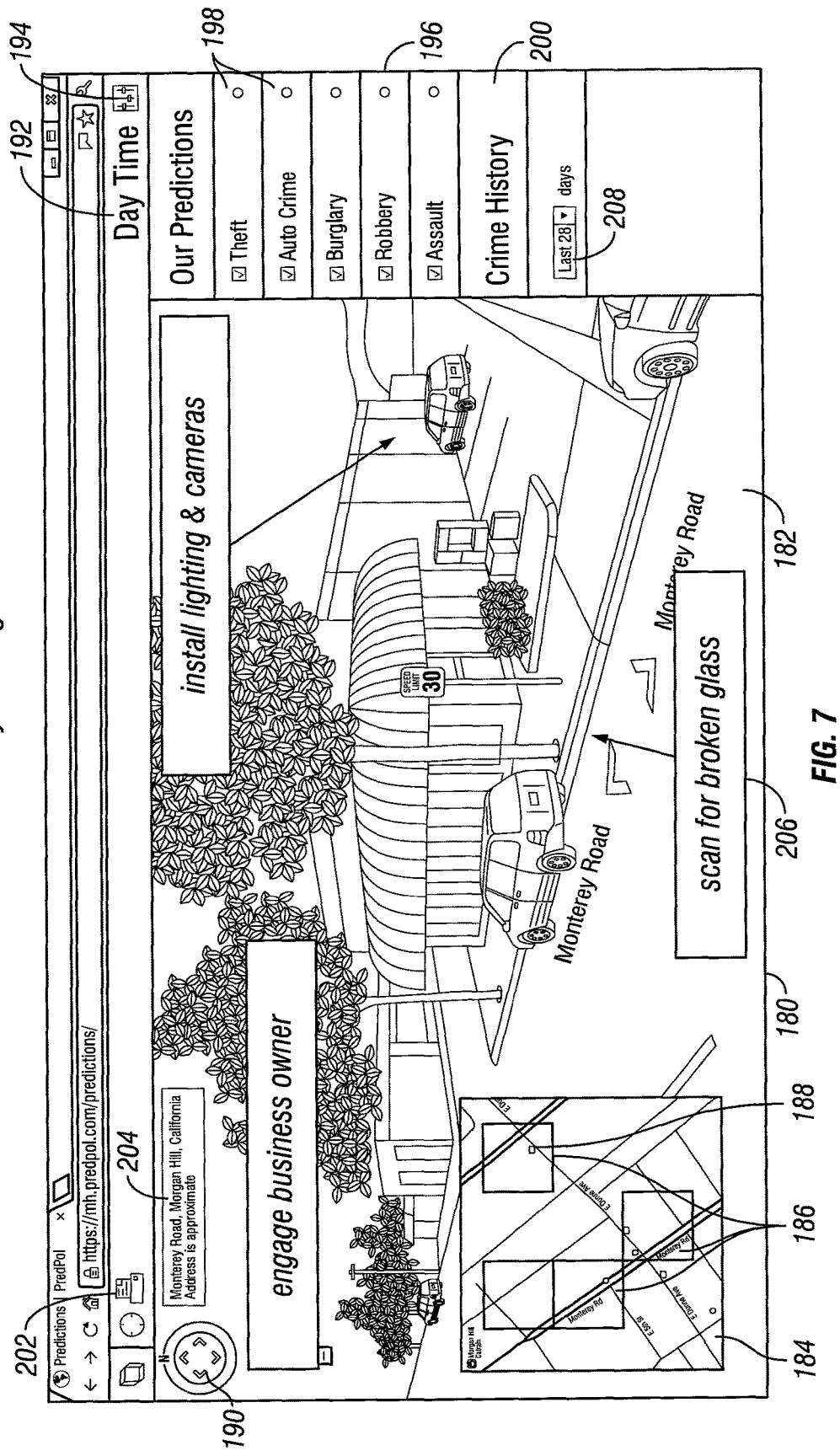
FIG. 7 is an alternative exemplary user interface depicting a street level view of a hotspot area along with patrol suggestion remarks.

Turning now to FIG. 7, another exemplary user interface 180 is displayed. In this example, the user interface includes a street level view 182 that depicts a region with the prediction box 154 (FIG. 6). In addition, a thumbnail overlay 184 that displays one or more prediction boxes 186 along with a user selected patrol officer's current location 188 based on a GPS reading or a plurality of officer locations may be shown. The view may be panned using the panning tool 190. A shift indicator 192 appears on the upper right of the screen next to a settings box 194 that the user may select to input various user settings. A menu 196 of crime types 198 such as theft, auto crime, burglary, robbery, and assault is provided so that a user may customize the prediction boxes 186 to present crime risk and probability data for a particular crime type resulting in an output such as those shown in FIGS. 5A, 5C, and 6. Alternatively, the user may also select the crime history report 124 in FIG. 5B by selecting the crime history selector 200 allowing for historical crime data up to a certain time period selected by the user using the drop down time selector 208 and either bringing up the report on the screen or selecting the print button 202 to get a hard copy report.

Still referring to FIG. 7, the current map view location indicator 204 is displayed at the top of the viewing screen 182. To assist the patrol officers or screen viewer, one or more suggested patrol routines 206 may be displayed along with an arrow pointing to the specific region of interest. In this example, suggestions to "scan for broken glass", "install lighting and cameras", and "engage business owner" are presented on the screen. It will be appreciated that the suggestions may assist the patrol officers when engaging the community by providing suggestions to reduce or deter crime.

Figure 8:
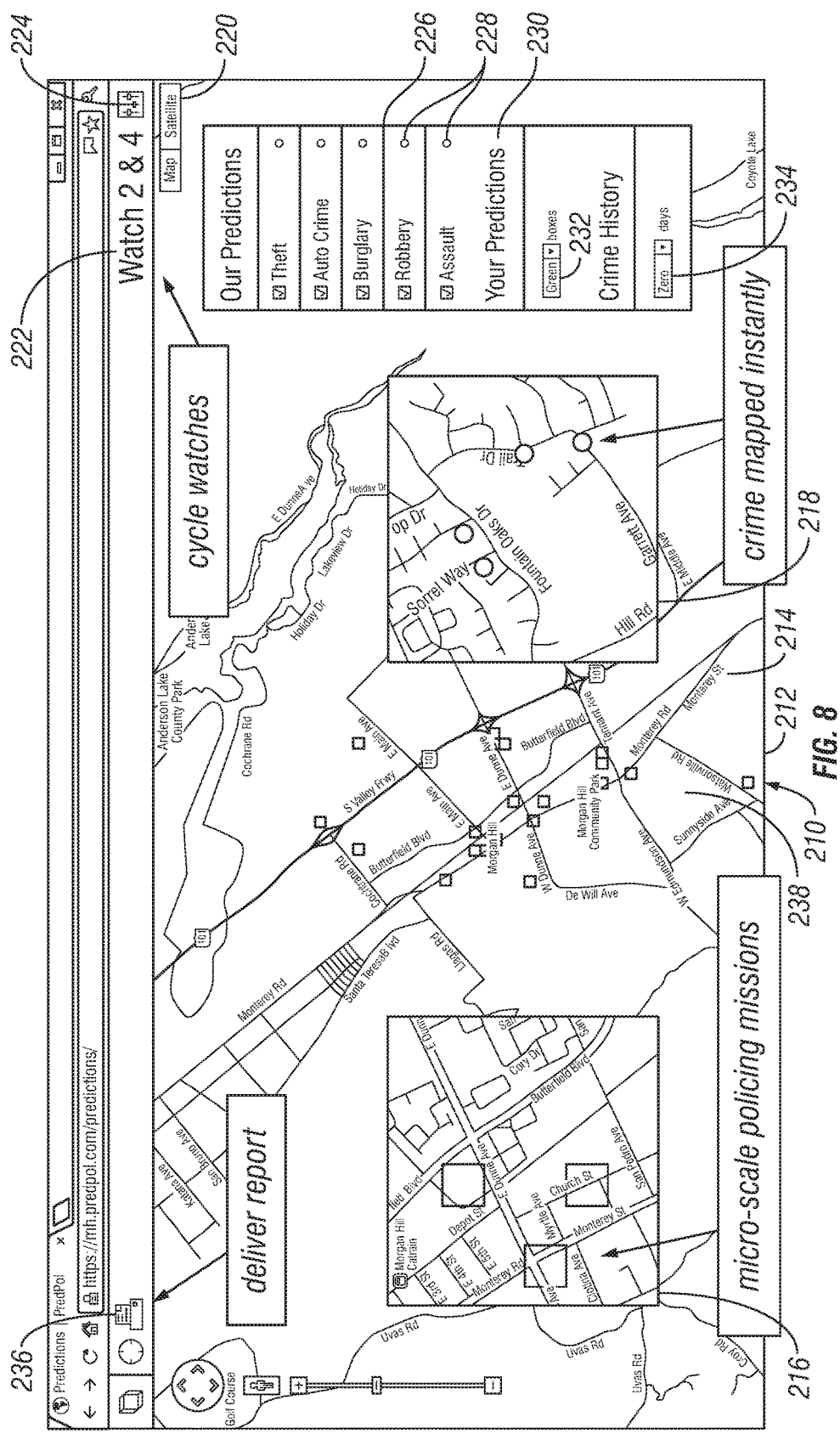
FIG. 8 is an exemplary user interface for selecting reports using the predictive policing system of FIGS. 1-4.

Turning now to FIG. 8, a primary interface screen 210 for accessing all of the reports discussed herein is displayed. This page may be made available to a user using the police network client 24, user at the user terminal 56, or data center computer 14 or wherever a device includes a network communication interface, display device, and input device to interface with the predpol predictive server 14. On this primary page 210, reached after a user with an account logs into the predpol system 10, the user is presented with a main report type area 212 generally represented by a map display 214. A first report icon or thumbnail 216 corresponding to the predictive box reports 86, 142, 156 (FIGS. 5A, 5C, and 6) is displayed to the left of a second report type icon of thumbnail 218 corresponding to the crime report 124 (FIG. 5B). Each icon is selectable to bring up the requested report style.

Still referring to FIG. 8, the user may also cycle views between map and satellite using the view selector 220. The watch indicator 222 displays the current watch for which a report is being generated and may a current, past, or future watch or shift. A settings button or icon 224 enables a user to control the settings for each report including crime type. There is also a menu 226 similar to the menu 196 in FIG. 6 that enables a user to select from one or more crime types 228 to generate a set of predictions processed and prepared by the predictive server 14. A crime analyst 94 (FIG. 4) or other user may also select a predictions entry tab 230 to enter crime predictions based on other data. Beneath the predictions entry tab is a box color indicator 232 that enables the user to select various colors for the prediction boxes. Colors may be associated with crime types or user predictions to distinguish between categories. Beneath the box color indicator 232 on the menu 226 is a crime history time interval selector 234 that allow a user to select a historical time period for the crime data using a drop down box. After a user selects all the pertinent settings and a report type, the user will be presented with an onscreen report such as one those shown in FIGS. 5A-C and 6 depending on the report type selected. In addition, the use may select the print icon 236 to print out a hard copy report.

With continued reference to FIG. 8, it will be appreciated that the first report type icon 216 or second report type icon 218 may be moved around the screen 214 to magnify a position. For example, the section 238 between the two icons 216, 218 is zoomed out and provides less detail but a bigger picture while portions appearing beneath the icons are zoomed in and provide additional detail regarding the selected area.

All of these reports 86, 124, 142, 156, and 180 (FIGS. 5A-5C, 6, and 7, respectively) may be provided to a watch officer or supervisor and handed out to patrol officers at the beginning of the watch or shift. Manpower and related resources may be shifted according to the predictive hotspots 144a, 144b shown in the report 142 (FIG. 5C). Moreover, patrol officers out in the field can request reports be delivered to their mobile devices 54 (FIG. 4) as well as update crime occurrences real time from the field back to the predictive server 14 for periodic or continuous calibration of crime data. The patrol officers may also phone in to the watch supervisor and based upon the GPS signal they transmit using their GPS units 102 (portable or vehicle based), request a determination if they currently reside within the hotspot 144a, 144b, or, if not, how close and the best path to get in the hotspot or box. The patrol officers may also use their own devices 54 out in the field to determine their location relative to a hotspot or prediction box 144a, 144b.

The ETAS Algorithm:

In general, predictions are based on a semi-parametric epidemic type aftershock sequence (ETAS) model of crime. The background rate of crime is modeled as an inhomogenous Poisson process. A parametric triggering kernel models the elevated risk following a crime. The background rate and kernel parameters are estimated by an expectation-maximization algorithm detailed below and in the Appendices to the provisional patent application incorporated by reference in their entireties herein.

In order to develop the predictions, the crime data 46 (FIG. 1) is processed by the predictive server 14 using an Epidemic Type Aftershock Sequence (ETAS) Point Process Crime Forecasting method. While an explanation of the various ETAS algorithms 76 (FIG. 2) incorporated into the predpol system 10 are explained in the Appendices to the provisional patent application incorporated by reference in its entirety herein, some explanation is provided here. However, it will be appreciated that other predictive algorithms may be used to process crime data and generate predictive boxes such as those described herein. Referring now to FIG. 9, an exemplary ETAS algorithm 76 taken from Appendix B of the provisional patent application incorporated by reference herein is presented. It will be appreciated that this algorithm may be translated into computer code for execution by the processor 42 of the data center 14.

In general, an exemplary Epidemic Type Aftershock Sequence (ETAS) point process crime forecasting algorithm may be as follows. The spatial domain is determined by the smallest rectangular region (lat-long coordinates) encompassing the geocoded addresses of the crime event data uploaded by the user. In addition the user may upload the estimated times of the criminal events. The inputted data is denoted by $(x_k, y_k, t_k)^N_{k=1}$ where N should be read as over the k=1. For accurate parameter estimates the data set size is preferred to be $N=O(10^3)$ for a spatial domain with side lengths of size $O(10$ km$)$. The domain may then be divided into equally sized rectangular cells over which the conditional intensity is assumed to be constant in space. The preferred, but not limiting, size of the cells is approximately 100 m-150 m on each side, although other size cells may be used. The conditional intensity of the point processing cell $c_m$ then satisfies the equation (1) 240 in FIG. 9 where g is exponential with parameter ω, multiplied by the branching ratio θ. These parameters are assumed to be constant across the entire spatial domain. The Expectation-Maximization algorithm (equations (2)-(6) 242) may then be used to estimate the model parameters, which iterates the Expectation steps (equations (2) and (3) and Maximization steps (equations (4)-(6) until convergence is reached (approximately in 10-50 iterations).

It will be appreciated that exact-repeat events (events occurring at the same location) are not treated by the standard point process literature and can cause complications for MLE, as they are either incorrectly assigned as background events or cause singularities to form in the triggering kernel and/or optimal bin width size in the background rate. To circumvent this issue and handle exact repeat events, pij=pii=0 may be used in Equations (5)-(6) if the event at $t_i$ is an exact repeat and j is an index of an event not at the same location.

It will be appreciated that a number of repeat crimes occur within a short period of time, as an offender may commit several crimes within a short period of time. Because police cannot adapt to events on such a fast time scale, the presence of these events lead to estimates of co that are not useful for directed patrols. For handling these type of fast time scale of near-repeat events, $p_{ij}=0$ is used in the case that i and j are in the same cell and separated in time by 1 hour or less.

In using the software user interface to input crime data 46 (FIG. 1) into the predpol system 10, each day the user may add the previous days crime events to the data set $(x_k, y_k, t_k)^N_{k=1}$ (read N over k=1) and rerun the algorithm. The algorithm may then ranks the cells (prediction boxes) according to the highest values of $\lambda_m(t)$ at time t when the algorithm is run. The highest M cells, where M is determined by police resources, may then be displayed on a Google map as shown for example in FIGS. 5A-6. It will be appreciated that this is merely an exemplary predictive algorithm and other suitable predictive algorithms will occur to one of ordinary skill in the art as, for example, those explained in the Appendices of the provisional patent application incorporated by reference in their entireties herein.

The Scoring Algorithm:

The scoring algorithm 82 (FIG. 2) may be used to rank the prediction boxes according to a certain threshold of probability to screen out very unlikely scenarios. Probabilities over a certain threshold may be displayed on the user interface or report. For example, all prediction boxes having a probability indicator 166 (FIG. 6) are displayed on the user interface or report 86 (FIG. 5A showing prediction box balloons 110*a-h*) while other balloons, for example 110*i-t* (not shown), are not shown on the display since they didn't make the probability cutoff. The threshold may be set by the user. The scoring algorithm may also be used to generate a score in a prediction box by summing the probabilities of one or more crimes occurring for each crime type corresponding to the filtered crime types selected by the user. The scores can then be used to flag high risk areas for directed patrol.

In Use:

Referring now to FIGS. 1-8, while the predpol system 10 (FIG. 1) incorporates a powerful crime predicting engine (software), emphasis is placed on ease of use to encourage use and short learning curves. In this exemplary embodiment, wherein the predpol system 10 is offered as a website application over the internet 18, the user (for example, patrol officer 98, crime analyst 94 in FIG. 4, or watch supervisor with access to the internet 18 using the police network 16) may simply access the predpol website at www.predpol.com or https://mh.predpol.com from the user computer 54 or other mobile device with internet access and a browser and bring up a typical login screen requiring a username and password using a secure https connection 22 (FIG. 1). Assuming a registered account is available to the user, once logged in, the user is presented with the main user interface 210 (FIG. 8) and may select from one of several prediction options for each watch or shift. Examples of prediction options (categories) from a pull down menu 226 include theft, auto crime, burglary, robbery, and assault. The user may also select user settings including shift using the watch cycle indicator 222 and report type using the respective icons 216, 218.

One click later, a prediction report 86, 124, 142, 156 or 180 (FIGS. 5A-C, 6, and 7 respectively) may be generated on the user interface 56. Reports may be printed out onto a hard copy format using an attached or wireless printer by selecting the print icon 236 (FIG. 8) or sent directly to a computer terminal monitor or mobile device such as cell phone, smart phone, or tablet. Two types of primary reports are available: micro-scale policing missions 216 (FIGS. 5A, 5C, and 6) and crime mapped instantly 218 (FIG. 5B). The street level and suggestion report (FIG. 7) may also be accessed and printed out. The user may also cycle through the watches to see customized reports for each individual watch or groups of watches. Supervisors may then brief patrol officers on predictive policing goals, and further assist them with getting in the predictive crime area (the box) 144*a*, 144*b*, 154 for example. Since the predpol system 10 is includes both historical crime data 46 and frequently or continuously updated with real-time crime data 104 (FIG. 4), patrol officers also have the option of accessing real-time or updated predictions on-demand on any mobile device out in the field or at the stationhouse.

Prediction and crime mapping options 216, 218 are interchangeable with one click of a mouse or selection by an alternative input device 62 using the settings menu 226. By selecting the watch banner 222, that displays the current watch, the user may cycle through each watch to generate reports (FIG. 5A) tailored to the selected watch or watches.

In addition to generating watch based reports, the predpol system 10 may be used to merge policing best practices with the precision of crime prediction. More specifically, knowing where and when crimes are likely to occur is the first step in successfully deterring and disrupting crime. The next step after reviewing the shift reports is deploying police resources where expert knowledge, skills, and experience can be used to the greatest effect. The predpol system's user-friendly interface encourages use and doesn't provide distracting elements. The tactical directive is clear as provided by the predpol system 10. It's a "get in the box" directive, the box being the predicted crime hotspot 144*a*, 144*b*, 154 as in FIGS. 5C and 6, respectively. By deploying patrol officers in the field in the "box", this has been found to provide the best use of field resources and best chance of deterring and disrupting crime based on past events and predictive behaviors using the modified ETAS algorithm. Once in the box, crime deterrence and disruption is placed in the hands of patrol officers with the knowledge, skills, and experience to problem solve within the "box".

Another feature of the predpol system 10 is the allowance of discretionary time, which is the time that patrol officers have between handling calls-for-service and are "clear" to receive calls as the need arises. With a predpol prediction report 86, 124, 142, 156, 180 in hand, officers are able to quickly located the nearest prediction and get in the box 144*a*, 144*b*, 154. In addition, dedicated resources such as crime suppression teams, community service or reserve officers, or other specialized patrol units may be explicitly positioned for problem solving in the box.

Another instance of utility provided by the predpol system 10 is that the predpol system aids in crime prevention, disruption, and deterrence by providing hotspots so that officers may enter the box and use the SARA model to diagnose problems unique to that place. As is well known in police practices, the SARA model involves Scanning for immediate crime and disorder problems, Analyzing local causes of the problem, Responding to the problem with environmental modifications or community engagement, and Assessing the effectiveness of solutions. Similarly, under broken-windows policing, misdemeanor crimes are seen as the gateway to more serious crimes. Problem solving in the box that is oriented towards reducing misdemeanor crime may also reduce felony crime and misdemeanors may be reported as well.

Another feature addressed by the predpol system 10 is the enhancement of intelligence led policing inside the box. For example, so-called impact players are responsible for a large percentage of the crime occurring in any community. By combining predpol predictions with intelligence gathered by police officers about impact players, this enhances the ability of the police force to disrupt and deter crime within the box.

While predpol predictive boxes 144*a*, 144*b*, 154 are preferably small to maximize the available resources and impact, they represent locations of high risk for the communities that live within and adjacent to them. The predpol system 10 allows patrol officers to focus their efforts on building community partnerships to fight crime at the micro-scale in high risk areas. By interacting with people who live, or business owners who operate within prediction hotspots and giving them clear information about the risk they may face, this interaction between the police and the community puts residents and business owners in the best position to naturally deter crime and call for service in a timely and effective manner.

Exemplary Advantages:

It will be appreciated the predpol system 10 and simple to use interface speeds-up, augments and makes more effective stages in the criminal justice data cycle from analysis through to policing activity in micro-place locations specified by the predpol tool.

The web application is designed to be easy to use, relative to crime analysis software packages such as Crimestat that require expertise in GIS software such as ArcGIS, and the outputted maps are tailored for directed patrol use. Since the algorithm is implemented as a web application, the forecast maps could potentially be accessed via smart phone by officers on patrol, a unique feature of this invention.

Unlike other prospective hotspotting processes, the Earthquake Type Aftershock Sequence (ETAS) point process model of crime estimates (as incorporated into the predpol system 10), may use Maximum Likelihood Estimation (MLE) and take into account the prevalence of spontaneous and triggered events, as well as the time scale over which the elevated risks following crimes persists, in a systematic way, such that differences in crime patterns from city to city are automatically detected by the method.

The predpol system 10 also makes quantitatively accurate predictions of the locations and times of crimes by crime type and crime types in combination. The predictions are projected to prediction box maps that are tactically clear and easy for police officers to use. The prediction box maps may be made available in real-time from anywhere via appropriate communication devices to law enforcement connected to a cloud-based platform. The prediction boxes are small (500'×500' or 150×150 m) creating unique opportunities for micro-place policing.

Moreover, the predpol system 10 is precise. The technology predicts where crimes are likely to occur in place-based prediction boxes as small as 500 feet by 500 feet. Officers may be briefed at roll call on the highest-probability "hot spots" for that day and devote extra attention to those areas—as much as fifteen minutes every two hours. In contrast to technology that analyzes and maps past crime for some hints at the future—a kind of "rear view mirror" policing—the predpol system 10 tells law enforcement what is coming. Traditional mapping tools are calibrated less frequently, rely on humans to recognize patterns, and allocate resources based on past crimes rather than predicted future offenses.

The predpol system 10 is also intuitive. For officers, the predpol system output and reports are accessible from any tech device or may be made available in a hard copy format. For analysts, the predpol system may be set up within days and generates its actionable predictions in one click of a mouse or other suitable input selection device such as a keyboard, keypad, trackpad. For managers, the cloud based solution means that there is no new hardware, no additional technical staff, and no budget-busting installation fees. Training is simple, short, and intuitive.

The predpol system 10 is also secure and reliable. The tool is constructed to run on a secure, cloud-based software-as-a-service (SaaS) platform. To facilitate confidentiality, it is preferred that personal information about victims, offenders, or law enforcement is not collected. To enhance security, the predpol system data processing facilities 14 preferably employ key card protocols, biometric scanning, and round-the-clock interior and exterior surveillance.

It will be appreciated that the predpol system 10 provides a real time, cloud-based, SaaS, crime prediction process with specific actionable intelligence (i.e. 500×500 at a certain time window for a certain crime type or types. It will further be appreciated that the predpol system 10 is designed to fit seamlessly into the criminal justice data cycle and modern policing practices. The criminal justice data cycle actively connects many parts of the law enforcement agency: patrol and investigative officers respond to crime, officers collect data about crime events, crime data is validated and aggregated by it services, analysts work with crime data to detect patterns, command staff utilizes crime patterns to develop tactical responses, patrol and crime prevention officers use their knowledge skills and experience to implement tactical directives, and activity in the field deters and disrupts crime.

The predpol system 10 enhances the criminal justice data cycle through its role in crime analysis, tactical planning, and identifying key hotspots for field-based problem solving and crime prevention. Some of the features of the predpol system 10 are: a) fast crime prediction reports that may be made immediately available to patrol officers; b) predictions that offer clear tactical directives; and c) identification of hotspot locations where the knowledge, skills and experience of the officer may have the greatest impact.

Alternative Applications:

While the exemplary embodiments discussed herein involve crime forecasting, the present invention is much more broadly contemplated than being solely limited to crime forecasting, including both felonies and misdemeanors. Thus, it will be appreciated that other event forecasting reports may be produced using the predpol system 10 depending on the input data received. For example, predicting the location of improvised explosive devices (IEDs), traffic accidents, and terrorist activities as other examples that may all be handled by the predpol system after receiving historical data relating to these types of events.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof.

It will further be appreciated that other modifications may be incorporated into the predpol application and system 10. For example, events following another event by one hour or less in time are not typically used to estimate the triggering kernel. The reason for this is that patrol routes are only updated daily and cannot adapt fast enough to these fast crime clusters. It has been found that daily forecasting accuracy in retrospective experiments improves with their exclusion.

In addition, the predpol software may account for multiple event types and estimates the probability of each type in a forecasting cell. This allows the police to focus on residential burglary or auto theft (or other selected crime) in a given neighborhood for example. This is provided by the Pveh icon 170 and Pres icon 172 in FIG. 6 for example.

Also, the highest risk time windows are also preferably included in the forecasts. This is the TW indicator 168 in FIG. 6 for example. Officers should make patrols during these time periods, in addition to patrols throughout the day when they are not on a call.

It will be appreciated that one or more micro-processing devices (or one or more servers) will suffice and be a workable alternative for storing and running the predictive policing system 10. In other words, in a networked environment, the program modules and database may all be resident on a single web server or multiple servers and accessible to one or more processors. Related to this, while the above-reference exemplary embodiment was described in terms of a client-server architecture, other suitable network architectures includes peer-to-peer and cloud computing types for providing a network environment over which the predictive policing system 10 may operate. In addition to being accessible over the network on a free or subscription basis, the predictive policing program modules and/or database may be downloadable over a telecommunication network or loaded onto a portable digital storage device such as a hard drive, flash drive, optical disc, tape drive, or other conventional digital storage medium as a set or individually for implementation on a user's server or computing device system having the capability of running the program modules and/or database.

While the solution discussed herein may reside primarily on the Web and the preferred embodiment described herein is structured in terms of handling this process over the Web, this is not meant to be limiting in any manner as local area and wide area networks, ranging from publicly accessible to internally managed private networks, may provide satisfactory solutions to incorporate and handle these crime prediction solutions. More specifically, the term WWW, Internet, Web, local area network (LAN), wide area network (WAN), and network should all be deemed interchangeable. In addition, these networks may either form a portion or the entirety of the telecommunication system for transmitting the crime data and prediction reports and may be used in conjunction with cellular, microwave, fiber optic, telephone, and satellite networks with both wired and wireless connections.

Certain objects and advantages of the invention are described herein. Of course, it is to be understood that not necessarily all such objects or advantages may be achieved in accordance with any particular embodiment of the invention. Thus, for example, those skilled in the art will recognized that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments may be combined with or substituted for one another in order to form varying modes of the disclosed invention. Thus, it is intended that the scope of the present invention herein disclosed should not be limited by the particular disclosed embodiments described above, but should be determined by a fair reading of the claims that follow.

What is claimed is:

1. A computer implemented predictive policing system comprising:
   at least one display device;
   a storage medium storing a plurality of crime events with each crime event defined by a location component, a historical time component, and a crime type;
   at least one prediction processing device having an accessible memory component and operable to be placed in communication with the at least one display device and the storage medium;
   a prediction engine defining a plurality of instructions retrievable into the memory component to be executed by the prediction processing device to:
   obtain a run time;
   obtain a time interval including a prospective time component relative to the run time;
   obtain a display threshold defining at least one display element cutoff;
   define a map of a geographic region incorporating at least one location component from the plurality of historical crime events, the map including one or more location identifiers tied to the geographic region;
   process at least some of the plurality of historical crime events available in the storage medium to define one or more predictive hotspot regions within the geographic region, each predictive hotspot region representing the probability of one or more crime events occurring within the associated hotspot region during the prospective time component of the time interval; and
   visually depict a crime forecasting report on the at least one display device, the crime forecasting report including the map of the geographic region, a time interval indicator corresponding to the time interval, and at least one predictive hotspot region responsive to the display element cutoff of the display threshold illustrated by an outline incorporating at least a portion of the geographic region with one or more location identifiers, the crime forecasting report further depicting at least one crime type and the probability of the at least one crime type occurring within the at least one predictive hotspot region and within the prospective time component of the time interval.

2. The computer implemented predictive policing system of claim 1 wherein:
   the crime forecasting report depicts the time interval indicator distinct from a run time indicator associated with the run time on the at least one display device.

3. The computer implemented predictive policing system of claim 1 further comprising:
   at least one remote location based unit in communication with the at least one prediction processing device, the remote location based unit constructed to update the storage medium with one or more crime events historically more recent than those historical crime events previously stored in the storage medium.

4. The computer implemented predictive policing system of claim 1 wherein:
   the prediction engine includes a further instruction to be executed by the prediction processing device to obtain at least one user selected crime type; and
   the crime forecasting report includes at least one identified predictive hotspot region associated with the at least one user selected crime type.

5. The computer implemented predictive policing system of claim 1 wherein:
   the prediction engine includes a further instruction to be executed by the prediction processing device to score a plurality of the predictive hotspot regions;
   based on the scores of the predictive hotspot regions, rank the predictive hotspot regions relative to one another; and
   compare the rank of each predictive hotspot region to the display threshold to determine which predictive hotspot regions are displayed in the crime forecasting report.

6. The computer implemented predictive policing system of claim 1 wherein:

the prediction engine includes a further instruction to be executed by the prediction processing device to obtain at least one user selected watch shift as the time interval.

7. The computer implemented predictive policing system of claim 1 wherein:
the location identifiers are street identifiers.

8. The computer implemented predictive policing system of claim 1 wherein:
the crime forecasting report, as displayed on the display device, further includes a high risk indicator representing a time window including a higher probability relative to a probability associated with at least one other time window during the time interval.

9. The computer implemented predictive policing system of claim 8 wherein:
the high risk indicator includes a start time of one or more highest risk time windows in at least one predictive hotspot region in the crime forecasting report.

10. The computer implemented predictive policing system of claim 8 wherein:
the time window of the high risk indicator is a one hour risk window based on a 24 hour clock.

11. The computer implemented predictive policing system of claim 1 wherein:
the prediction engine queries the storage medium on a continuous basis or a periodic basis to retrieve crime event updates.

12. The computer implemented predictive policing system of claim 1 wherein:
the prediction engine is further instructed to associate a penal code with each crime type.

13. The computer implemented predictive policing system of claim 1 wherein:
the historical time component of each crime event includes a date of occurrence element and a time of occurrence element.

14. The computer implemented predictive policing system of claim 1 wherein:
the crime forecasting report is displayed on the display device depicting a plurality of predictive hotspot regions with at least one predictive hotspot region visually representing a plurality of crime events and a plurality crime types and a probability associated with each crime type occurring within the at least one predictive hotspot region and within the prospective time component of the time interval.

15. The computer implemented predictive policing system of claim 1 wherein:
the identified predictive hotspot regions are visually represented on the display device by outlined regions.

16. The computer implemented predictive policing system of claim 15 wherein:
the outlined regions are four-sided.

17. The computer implemented predictive policing system of claim 1 wherein:
the crime types are selected from theft, auto crime, burglary, robbery, assault, and other felonies and misdemeanors having a penal code associated with a jurisdiction falling within the map.

18. The computer implemented predictive policing system of claim 1 wherein:
at least one predictive hotspot region represents a spatial region of at least 500 feet by 500 feet.

19. The computer implemented predictive policing system of claim 1 wherein:
the crime forecasting report further includes a crime history visually depicted by one or more of crime history display elements associated with one or more crime types.

20. The computer implemented predictive policing system of claim 1 wherein:
the prediction engine includes a further instruction to alter the map on the display device with the crime forecasting report.

21. The computer implemented predictive policing system of claim 1 wherein:
the display element cutoff is a user selected probability.

22. The computer implemented predictive policing system of claim 1 wherein:
the display element cutoff is a user selected ranking.

23. The computer implemented predictive policing system of claim 1 wherein:
the display element cutoff is a user selected crime type.

24. The computer implemented predictive policing system of claim 1 wherein:
the location components available in the storage medium without geocoding are geocoded by the prediction processing device prior to defining the map of the geographic region.

25. The computer implemented predictive policing system of claim 1 wherein:
the crime forecasting report depicts a plurality of predictive hotspot regions, each predictive hotspot region being tied to a discrete location component and having a corresponding discrete probability of at least one crime type occurring within the prospective time component of the time interval.

26. The computer implemented predictive policing system of claim 1 wherein:
the crime forecasting report includes an age of report indicator displayed on the at least one display device.

27. The computer implemented predictive policing system of claim 1 wherein:
at least one probability generated by the prediction processing device takes into account a spatial distribution of risk, a temporal distribution of risk, and the presence or absence of at least one spontaneous event and at least one triggered event.

28. The computer implemented predictive policing system of claim 1 wherein:
the crime forecasting report includes at least one reduced visual element associated with at least one predictive hotspot region that, when selected, expands into an information display indicating at least one probability by crime type and a high risk time window associated with the at least one predictive hotspot region.

* * * * *